United States Patent Office.

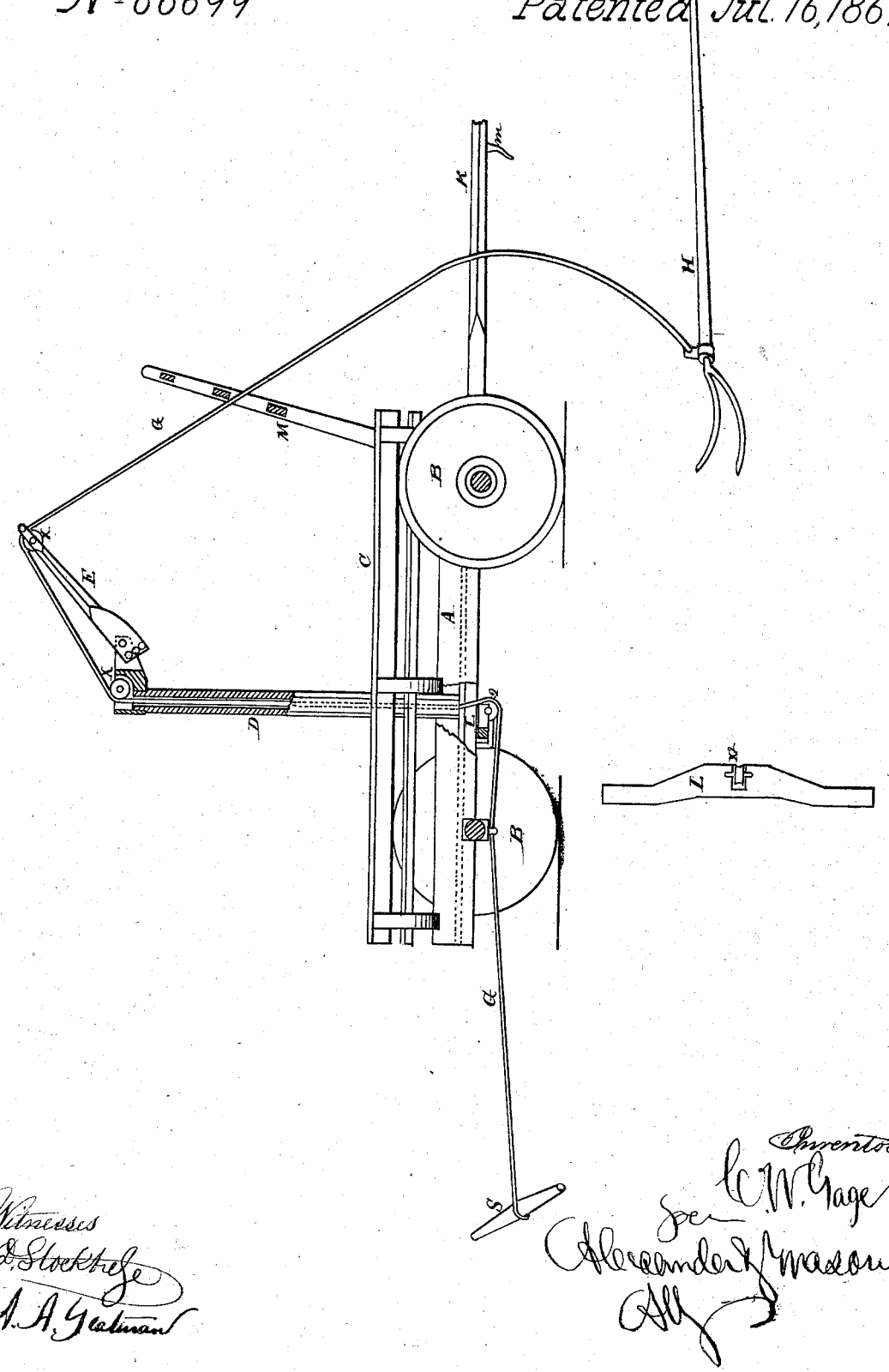

C. W. GAGE, OF HOMER, NEW YORK.

Letters Patent No. 66,699, dated July 16, 1867.

---

IMPROVEMENT IN HAY-LOADERS.

---

The Schedule referred to in these Letters Patent and making part of the same.

---

TO ALL WHOM IT MAY CONCERN:

Be it known that I, C. W. GAGE, of Homer, in the county of Cortland, and in the State of New York, have invented certain new and useful Devices for Loading and Unloading Hay; and do hereby declare that the following is a full, clear, and exact description thereof, reference being had to the accompanying drawings, and to the letters of reference marked thereon, making a part of this specification.

A represents the bed of any ordinary hay-wagon, having suitable wheels B and side stays C to keep the hay in the wagon. Near the centre of the wagon I attach an adjustable hollow shaft, D, which is provided with a metallic collar at its top, to which is connected the beam E, which is placed usually in the diagonal position shown, to not interfere with the hay in loading.

It will be seen that the arm E is connected to the shaft D by means of a pin passing through the collar, and is provided with two or more small holes for adjusting the said arm at any desired angle. After considerable hay is upon the bed of the wagon this arm E would be greatly in the way and obstruct the operation of loading, while by the means above set forth the arm is elevated and secured in such a manner as not to interfere. When the wagon is taken into the stable or shed this arm is lowered and not liable to be broken, as would be the case if stationary. There is a pulley, $x$, secured between the metal collar at the top of the shaft, and one, $x^1$, at the extremity of the beam E, and also in the centre of the brake L, which is attached to the under side of the wagon, beneath the shaft D. Passing from the rear end of the wagon, under the same, around pulley $x^2$, up through the shaft D, over the pulleys $x$ and $x^1$, and from thence over the front of the wagon, is a rope, G, which is connected to the hay-fork H.

The operation of this device is substantially as follows: The wagon is placed at the point where the hay is to be loaded, and there stationed by means of the brake L, and a pin, $m$, in the end of the wagon tongue K, which is inserted in the earth. Horse or other power is then attached to the end S of the rope G. The operator handles the hay-fork H, and when said fork is thrust in the hay the horse draws the rope, and with it the hay-fork and hay thereon. The horse is then brought back to the rear of the wagon and the operation repeated. In unloading hay the rope is detached from the fork H, relieved from the pulley $x^1$ and beam E, and passed over the beam and pulley in the stable or barn, and any horse hay-fork attached, so that the same horse operates the loading and unloading of the hay.

I am aware that the shaft D with rope passing under the brake-block has been used before.

What I claim is—

The adjustable arm E upon the end of shaft D, tongue K with spike $m$, sliding brake-bar L, in front of the rear wheels B B, and rope G, passing to the rear of the wagon, when combined, arranged, and operating in the manner and for the purposes specified.

In testimony that I claim the foregoing I have hereunto set my hand and seal this 28th day of November, 1866.

C. W. GAGE. [L. S.]

Witnesses:
C. M. ALEXANDER,
J. M. MASON.